(12) United States Patent
Tachibana et al.

(10) Patent No.: US 6,281,625 B1
(45) Date of Patent: Aug. 28, 2001

(54) FLUORESCENT LAMP WITH SPECIFIC PROTECTIVE FILM

(75) Inventors: Hirokazu Tachibana; Yoshinori Otaka, both of Osaka; Toyokazu Amano; Fumihiro Inagaki, both of Kyoto, all of (JP)

(73) Assignee: Matsushita Electronics Corporation, Osaka (JP)

( * ) Notice: Subject to any disclaimer, the term of this patent is extended or adjusted under 35 U.S.C. 154(b) by 0 days.

(21) Appl. No.: 09/294,502

(22) Filed: Apr. 20, 1999

(30) Foreign Application Priority Data

Apr. 28, 1998 (JP) .................................................... 10-118366

(51) Int. Cl.$^7$ ...................................................... H01J 31/00
(52) U.S. Cl. ............................................ 313/489; 313/635
(58) Field of Search ................................... 313/485, 489, 313/635

(56) References Cited

U.S. PATENT DOCUMENTS

| | | |
|---|---|---|
| 3,067,356 | 12/1962 | Ray . |
| 3,748,518 | 7/1973 | Lewis . |
| 3,842,306 | 10/1974 | Henderson et al. . |
| 4,079,288 | 3/1978 | Maloney et al. . |
| 5,002,917 | 3/1991 | Deller et al. . |
| 5,002,918 | 3/1991 | Deller et al. . |
| 5,552,665 | 9/1996 | Trushell . |
| 5,619,096 | 4/1997 | Kaliszewski et al. . |
| 5,811,924 | 9/1998 | Okumura et al. . |

FOREIGN PATENT DOCUMENTS

| | | |
|---|---|---|
| 825 635 | 2/1998 | (EP) . |
| 8-129987 | 5/1996 | (JP) . |

Primary Examiner—Vip Patel
(74) Attorney, Agent, or Firm—Merchant & Gould P.C.

(57) ABSTRACT

A fluorescent lamp highly capable of inhibiting penetration of mercury or ultraviolet ray, in which blackening of a glass tube is prevented, and which displays excellent luminous flux maintenance. The lamp has a protective film mainly composed of substantially spherical metal oxide particles, which is formed between a glass tube and a fluorescent layer on the inner surface of the glass tube.

6 Claims, 5 Drawing Sheets

FLUORESCENT LAMP WITH SPECIFIC PROTECTIVE FILM

FIELD OF THE INVENTION

The present invention relates to a fluorescent lamp having a protective layer formed on the inner surface of a glass tube, and to a method for producing the same.

BACKGROUND OF THE INVENTION

There has been a problem with a conventional fluorescent lamp in that its long-time operation results in blackening of a glass tube and reduced luminous flux. It is considered that such blackening is caused, for example, by the factors as follows: (1) reaction between mercury enclosed in the fluorescent lamp and alkali components in the glass tube forms amalgam; (2) metal mercury penetrates into the glass tube; and (3) solarization occurs due to ultraviolet ray. Thus, it is known that blackening of a glass tube is prevented and reduction in luminous flux is inhibited by forming a protective film comprising metal oxides between the glass tube and a fluorescent layer.

It is desired that the protective film is a dense, homogeneous film, which does not have non-uniformity or falling-off, so that its function as a protective film can be fully displayed. Generally, fine particles with an average particle diameter of about 1 $\mu$m or less are used as the metal oxides in such a protective film. The fine particles are uneven in shapes, and they have a needle-shape, or a dendritic or feather-like shape. Because such fine particles tend to aggregate easily, preparation of a suspension of these particles with good dispersibility has been difficult. When a suspension not fully dispersed is applied to a glass tube, it is likely that pinholes are developed due to non-uniform coating or falling-off of the particles. Particularly, a thin film tends to be significantly non-uniform and become discontinuous, so that it cannot fully display its function as a protective film. On the other hand, a film with increased thickness tends to generate cracks or falling-off, so that its function as a protective film cannot be obtained adequately.

SUMMARY OF THE INVENTION

Accordingly, it is an object of the present invention to provide a fluorescent lamp having a dense, homogeneous protective film, which prevents blackening of a glass tube and inhibits the reduction in luminous flux.

In order to attain the above object, a fluorescent lamp of the present invention comprises a glass tube, a protective film formed on the inner surface of the glass tube, and a fluorescent layer formed on the protective film, in which the protective film is mainly composed of substantially spherical metal oxide particles.

Furthermore, a method for producing a fluorescent lamp including a glass tube, a protective film formed on the inner surface of the glass tube, and a fluorescent layer formed on the protective film of the present invention comprises steps of:

preparing a suspension containing a dispersoid mainly composed of substantially spherical metal oxide particles; and applying the suspension to the inner surface of the glass tube followed by burning to form the protective film on the inner surface of the glass tube.

In the fluorescent lamp of the present invention, it is preferable that 60% or more, most preferably 80% or more, of the spherical metal oxide particles in the protective film are substantially spherical. In the method for producing a fluorescent lamp of the present invention, it is preferable that 60% or more, most preferably 80% or more, of the spherical metal oxide particles included as the dispersoid in the suspension are substantially spherical.

As a result of various researches, the inventors of the present invention have found that a dense, homogeneous protective film can be formed by mainly using spherical or approximately spherical metal oxide particles.

That is, increased flowability of such metal oxide particles enables the preparation of a suspension with excellent dispersibility. Furthermore, because the suspension has an improved coating property for the surface of a glass tube, a dense, homogeneous protective film can be formed with very little non-uniformity. Moreover, because this suspension has excellent dispersibility, the particles are difficult to aggregate when allowed to stand for a long time, so that it also has excellent stability. In addition, even if particle aggregation develops, the suspension can be re-dispersed easily.

DETAILED DESCRIPTION OF THE INVENTION

Figure 1:
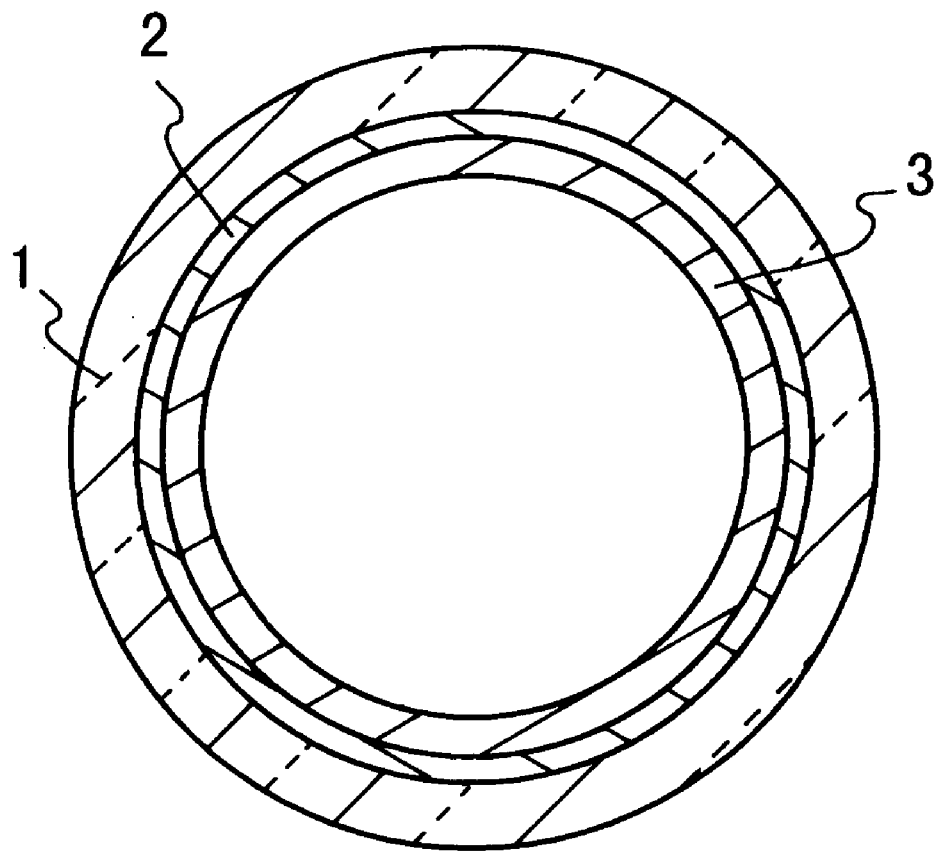
FIG. 1 is a cross-sectional view showing the configuration of main parts of a fluorescent lamp according to an embodiment of the present invention.

FIG. 1 shows a cross-section of a tube of a fluorescent lamp according to an embodiment of the present invention. As shown in FIG. 1, this fluorescent lamp includes a glass tube 1, a protective film 2 formed on the inner surface of the glass tube 1, and a fluorescent layer 3 formed on the protective film 2, the protective film 2 being mainly composed of metal oxides. Furthermore, although not shown in the drawing, electrodes etc. are provided at both ends of the glass tube 1, and rare gases are enclosed inside the tube together with mercury, as in general fluorescent lamps.

Next, a method for producing the fluorescent lamp is described below.

First, a suspension is prepared by mainly using spherical or approximately spherical metal oxide particles and using water as a dispersion medium. Then, after applying the suspension to the inner surface of the glass tube 1 followed by drying, it is burned to form the protective film 2. The metal oxide particles in the protective film 2 substantially maintain their original shapes after the burning.

By using such spherical or approximately spherical metal oxide particles with increased flowability, dispersibility of the suspension is increased. By using such a suspension with excellent dispersibility, non-uniformity of the coating is reduced, and a homogeneous protective film can be obtained with little unevenness in thickness. Moreover, particle aggregation is inhibited, so that a dense, homogeneous protective film can be formed with a small thickness.

After formation of the protective film, production of the fluorescent lamp is completed in accordance with conventional methods.

Hereinafter, the present invention will be further described in detail by referring to the following examples. It is to be understood, however, that these examples are not intended to limit the present invention.

EXAMPLE 1

Using spherical γ-$Al_2O_3$ particles with a long/short diameter ratio of 1/1 to 1.2/1 and an average particle diameter of 1 to 30 nm, and water as a dispersion medium, $Al_2O_3$ suspensions having concentrations of 1 wt. %, 2 wt. %, and 5 wt. % were prepared respectively.

The long diameter herein means the maximum diameter of a particle, the short diameter means the minimum diameter of the particle, and the average particle diameter means the average value between the long and short diameters. Therefore, in the case of a perfectly spherical particle, the long/short (maximum/minimum) diameter ratio is 1/1.

The spherical γ-$Al_2O_3$ particles with an average particle diameter of 1 to 30 nm can be produced, for example, by a vapor phase method. The vapor phase method herein means a method of producing ultra fine particles of a metal oxide, by heating a metal (e.g. Al) that is the material of a metal oxide to be obtained (e.g. $Al_2O_3$) so as to vaporize it, and allowing the vapor to react with oxygen. Furthermore, the diameter of the metal oxide particles can be controlled by adjusting the conditions of their production (conditions of reaction).

Each suspension was applied onto a flat glass substrate and dried with hot air, and thereafter it was burned at about 600° C. to form a coating film. Non-uniformity, falling-off, pinholes, and the like were not found in the coating film according to visual observation.

The thickness of the film was 0.3 μm in the case of 1 wt. % suspension, 0.5 μm in the case of 2 wt. % suspension, and 1 μm in the case of 5 wt. % suspension. Furthermore, the coating rate per unit area of the substrate was determined. The result showed that the coating rate was more than 95% even in the case of 1 wt. % suspension (film thickness of 0.3 μm). The coating rate was 99% in the case of 2 wt. % suspension (film thickness of 0.5 μm), and 100% in the case of 5 wt. % suspension (film thickness of 1 μm).

These results are shown in Table 1 below (samples 1-1 to 1-3).

TABLE 1

|  | $Al_2O_3$ concentration [wt. %] | Film Thickness [μm] | Coating Rate [%] |
| --- | --- | --- | --- |
| Sample 1-1 | 1 | 0.3 | >95 |
| Sample 1-2 | 2 | 0.5 | 99 |
| Sample 1-3 | 5 | 1 | 100 |
| Sample 1-4 | 2 | 0.5 | 77 |
| Sample 1-5 | 5 | 1 | 85 |

As shown in Table 1, the samples 1-1 to 1-3 have remarkably high coating rates with low $Al_2O_3$ concentrations and small film thickness, and may display their functions as a protective film sufficiently.

Table 1 also shows the results of the cases when forming coating films using γ-$Al_2O_3$ particles (average particle diameter of 20 nm) having a needle-shape or a dendritic or feather-like shape, which have been conventionally used, according to the same method as this example (samples 1-4 and 1-5). In these samples, the coating rate was about 77% in the case of a film with a thickness of 0.5 μm, and about 85% in the case of a film with a thickness of 1 μm. Thus, an adequate effect as a protective film was not obtained, compared with the samples 1-1 to 1-3 having the same film thickness. It is considered that, because conventional $Al_2O_3$ particles easily aggregate, non-uniformity is caused in the coating, which leads to decrease in the coating rate.

Figure 4:
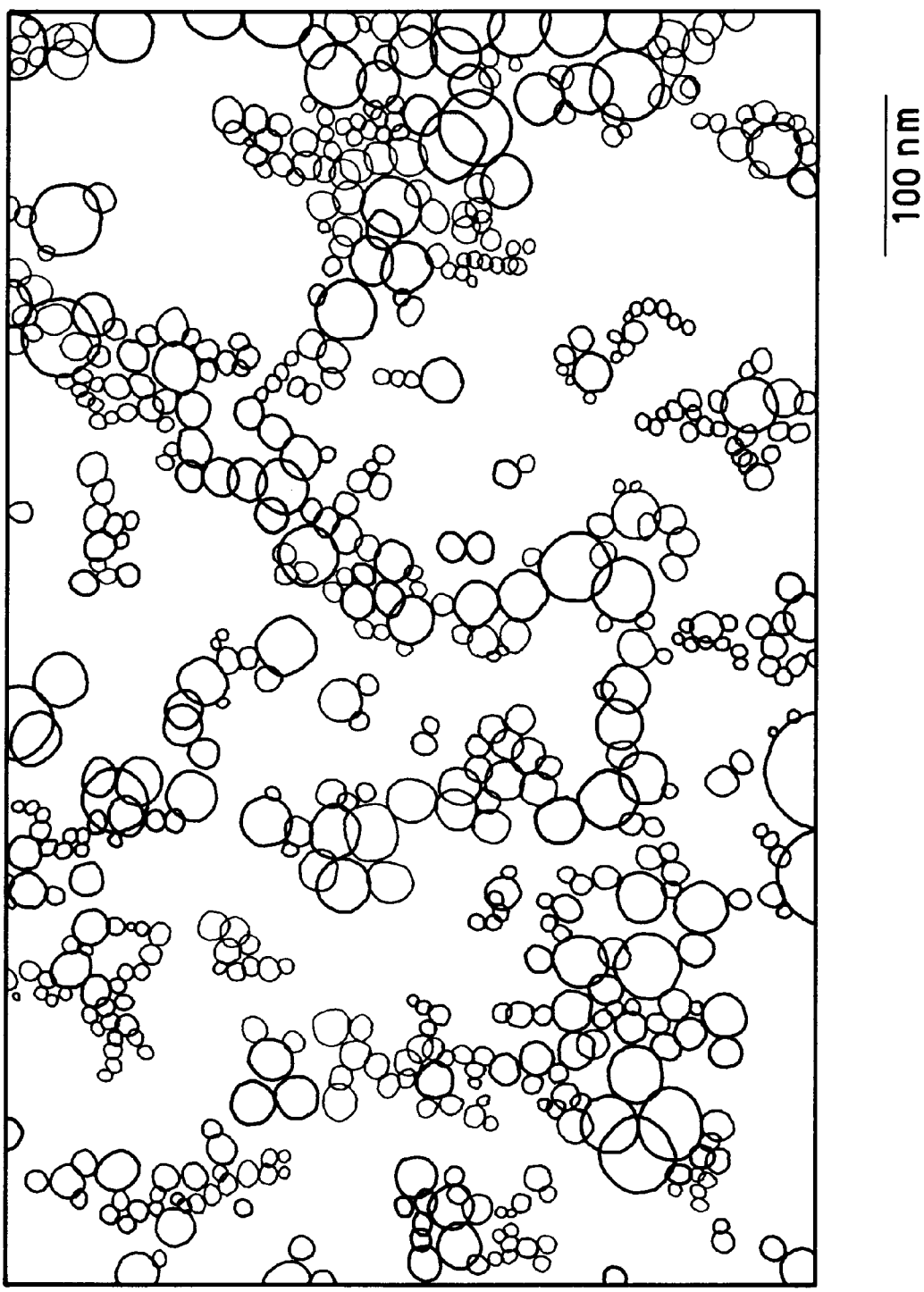
FIG. 4 shows spherical $\gamma$-$Al_2O_3$ particles used in a fluorescent lamp according to the present invention observed with a transmission electron microscope (TEM).
Figure 5:
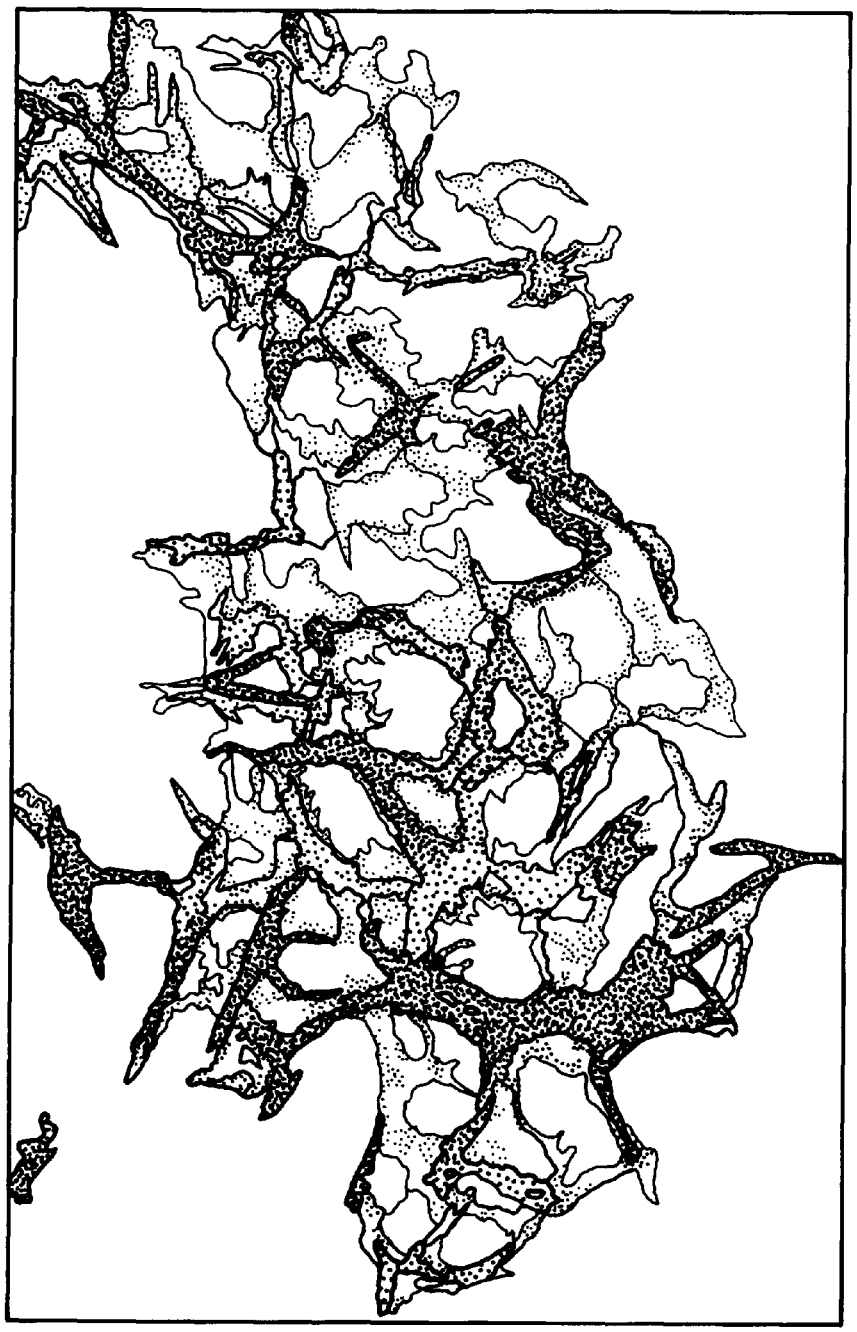
FIG. 5 shows conventional $\gamma$-$Al_2O_3$ particles observed with a transmission electron microscope.

Moreover, as shown in FIG. 4, when the γ-$Al_2O_3$ particles used in the samples 1-1 to 1-3 were observed with a transmission electron microscope (TEM), it was found that the spherical γ-$Al_2O_3$ particles were dispersed. The spherical γ-$Al_2O_3$ particles used in the samples 2-1 to 2-3 in Example 2 below, and those used in Examples 3–5 below were in the same condition. Furthermore, FIG. 5 shows conventional γ-$Al_2O_3$ particles observed with a transmission electron microscope.

EXAMPLE 2

Using spherical γ-$Al_2O_3$ particles with a long/short diameter ratio of 1/1 to 1.5/1 and average particle diameters of 1 to 50 nm, 30 to 70 nm, and 50 to 100 nm, respectively, and water as a dispersion medium, 2 wt. % $Al_2O_3$ suspensions were prepared. According to the same process as in Example 1, a coating film having a thickness of 0.5 μm was formed on a glass substrate. The coating rate per unit area of the substrate was determined. The results are shown in Table 2 below (samples 2-1 to 2-3).

TABLE 2

|  | Average Particle Diameter [nm] | Coating Rate [%] |
| --- | --- | --- |
| Sample 2-1 | 1–50 | 98 |
| Sample 2-2 | 30–70 | 96 |
| Sample 2-3 | 50–100 | 95 |
| Sample 2-4 | 50* | 75 |

*) The average particle diameter of the sample 2-4 is the value to all particles.

As shown in Table 2, any of these coating films has a coating rate of 95% or more, and may display its function as a protective film sufficiently. On the other hand, as shown in Table 2 as the sample 2-4, the coating film that was prepared using γ-$Al_2O_3$ particles having a needle-shape or a dendritic or feather-like shape with an average particle diameter of 50 nm (film thickness of 0.5 μm) had a coating rate of 75%, which was not enough to function as a protective film effectively. It is considered that such a low coating rate results from non-uniformity in the coating, as is the case in Example 1.

Moreover, even if the particles are spherical, when the long/short diameter ratio exceeds 1.5/1, the particles become close to a bar-shape, and dispersibility is decreased, so that the coating rate is reduced by about 3% in average. Consequently, the luminous flux maintenance is lowered. Furthermore, when the average particle diameter exceeds 100 nm, the filling property of the particles is decreased, so that the coating rate is reduced to less than 95%. As a result, the decrease in the luminous flux maintenance is greater than the case of the average particle diameter of 100 nm or less. On the other hand, it is not practical to use particles with an average particle diameter of less than 1 nm, since such particles of γ-$Al_2O_3$ are difficult to produce and are more likely to aggregate.

EXAMPLE 3

Using spherical particles of γ-$Al_2O_3$, $TiO_2$, $SiO_2$, and $Y_2O_3$, respectively, with a long/short diameter ratio of 1/1 to 1.5/1 and an average particle diameter of 1 to 50 nm, and water as a dispersion medium, 2 wt. % suspensions were prepared. According to the same process as in Example 1, a coating film having a thickness of 0.5 μm was formed on a glass substrate, and the coating rate was determined. The results are shown in Table 3 (samples 3-1 to 3-4).

TABLE 3

|  | Metal Oxide | Coating Rate [%] |
| --- | --- | --- |
| Sample 3-1 | $\gamma$-$Al_2O_3$ | 98 |
| Sample 3-2 | $TiO_2$ | 97 |
| Sample 3-3 | $SiO_2$ | 99 |
| Sample 3-4 | $Y_2O_3$ | 98 |

As shown in Table 3, all the samples have very high coating rates, and may display their functions as a protective film sufficiently.

EXAMPLE 4

Figure 2:
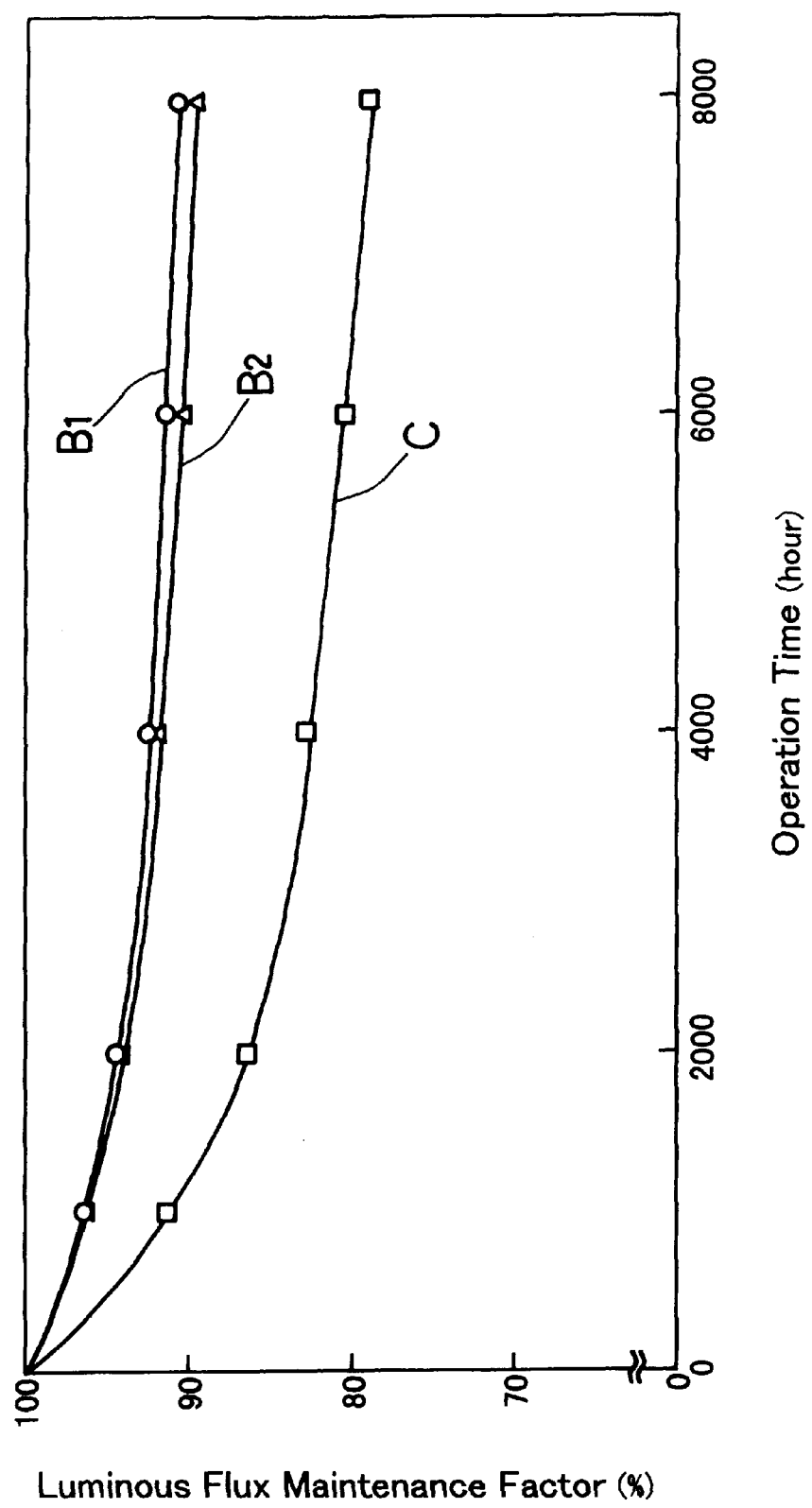
FIG. 2 is a graph showing the luminous flux maintenance of straight-tube fluorescent lamps of the present invention and of a conventional type.

FIG. 2 is a graph showing the relationship between the operation time and the luminous flux maintenance factor (hereinafter referred to as "luminous flux maintenance") of a straight-tube fluorescent lamp of 40 W rating. The curve $B_1$ shows the luminous flux maintenance of a fluorescent lamp in which a protective film is formed with a suspension prepared by using spherical $\gamma$-$Al_2O_3$ particles with a long/short diameter ratio of 1/1 to 1.5/1 and an average particle diameter of 1 to 50 nm; and the curve $B_2$ shows the luminous flux maintenance of a fluorescent lamp in which a protective film is formed with a suspension prepared by using spherical $\gamma$-$Al_2O_3$ particles with a long/short diameter ratio of 1/1 to 1.5/1 and an average particle diameter of 50 to 100 nm. Furthermore, the curve C shows the luminous flux maintenance of a conventional fluorescent lamp in which a protective film is formed with a suspension prepared by using $\gamma$-$Al_2O_3$ particles with an average particle diameter of 20 nm. Moreover, the film thickness was 0.5 μm in all of these cases.

At the operation time of 8000 hours, the luminous flux maintenance factors of the fluorescent lamps of this Example were 90 to 91% as shown by the curves $B_1$ and $B_2$, while the luminous flux maintenance factor of the conventional fluorescent lamp was decreased to about 80% as shown by the curve C. In the protective films of this Example, the coating rates were as high as 95% or more, so that blackening of the glass tube due to mercury or ultraviolet ray was effectively inhibited, and high luminous flux maintenance was obtained. On the other hand, in the protective film of the conventional lamp, the coating rate was as low as 77%, so that the amount of the mercury or ultraviolet ray which contacts the glass tube was increased. Accordingly, blackening of the glass tube caused by the factors such as reactions between mercury and alkali components in the glass tube, solarization due to ultraviolet ray, etc., was promoted, so that the luminous flux maintenance was reduced.

EXAMPLE 5

Figure 3:
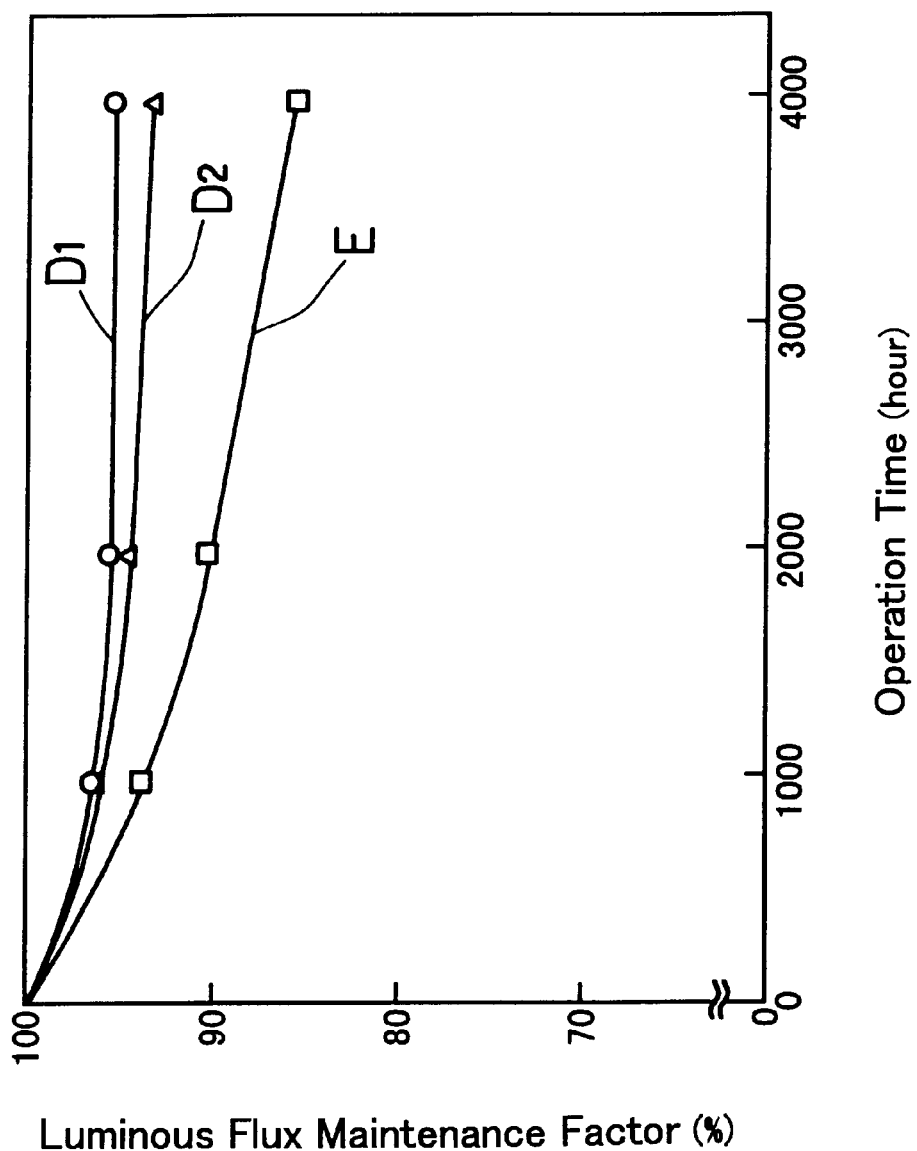
FIG. 3 is a graph showing the luminous flux maintenance of circular-tube fluorescent lamps of the present invention and of a conventional type.

FIG. 3 is a graph showing the luminous flux maintenance of a circular-tube fluorescent lamp of 30 W rating. The curve $D_1$ shows the luminous flux maintenance of a fluorescent lamp in which a protective film is formed with a suspension prepared by using spherical $\gamma$-$Al_2O_3$ particles having a long/short diameter ratio of 1/1 to 1.5/1 and an average particle diameter of 1 to 50 nm; and the curve $D_2$ shows the luminous flux maintenance of a fluorescent lamp in which a protective film is formed with a suspension prepared by using spherical $\gamma$-$Al_2O_3$ particles having a long/short diameter ratio of 1/1 to 1.5/1 and an average particle diameter of 50 to 100 nm. Furthermore, the curve E shows the luminous flux maintenance of a conventional fluorescent lamp in which a protective film is formed with a suspension prepared by using $\gamma$-$Al_2O_3$ particles having an average particle diameter of 20 nm. Moreover, the film thickness was 0.5 μm in all of these cases.

At the operation time of 4000 hours, the luminous flux maintenance factors of the fluorescent lamps of this Example were 93 to 95% as shown by the curves $D_1$ and $D_2$, while the luminous flux maintenance factor of the conventional fluorescent lamp was decreased to about 85% as shown by the curve E. Thus, it is shown that the protective films have different effects as in Example 4.

In the above examples, $\gamma$-$Al_2O_3$ particles are mainly used as the material of the protective films. However, the same effects can be obtained with other types of particles, for example, $\alpha$-$Al_2O_3$, or mixtures of $\alpha$-$Al_2O_3$ and $\gamma$-$Al_2O_3$. Furthermore, approximately same effects can be obtained by using any of $TiO_2$, $SiO_2$, and $Y_2O_3$, or combinations of two or more from $Al_2O_3$, $TiO_2$, $SiO_2$, and $Y_2O_3$. Moreover, the dispersion medium of the suspension is not limited to water, and organic mediums such as butyl acetate may also be used. Moreover, binders etc. may also be added as needed.

In each of the above examples, spherical or approximately spherical $\gamma$-$Al_2O_3$ particles are used in amounts of 100 percent. This is not particularly limiting, however, and unless contrary to the main aims of the present invention, these particles may be mixed with conventional materials as appropriate, and are used in the protective films without reducing the coating rate and luminous flux maintenance.

Finally, it is understood that the invention may be embodied in other specific forms without departing from the spirit or essential characteristics thereof The embodiments disclosed in this application are to be considered in all respects as illustrative and not restrictive, so that the scope of the invention being indicated by the appended claims rather than by the foregoing description, and all changes which come within the meaning and range of equivalency of the claims are intended to be embraced therein.

What is claimed is:

1. A fluorescent lamp comprising a glass tube, a protective film formed on the inner surface of the glass tube, and a fluorescent layer formed on the protective film, wherein the protective film is mainly composed of substantially spherical metal oxide particles and the long/short diameter ratio of the metal oxide particles is between 1/1 and 1.5/1.

2. The fluorescent lamp according to claim 1, wherein the average particle diameter of the metal oxide particles is between 1 nm and 100 nm.

3. The fluorescent lamp according to claim 1, wherein the metal oxide is particles comprise at least one selected from $Al_2O_3$, $TiO_2$, $SiO_2$, and $Y_2O_3$.

4. A method for producing a fluorescent lamp comprising a glass tube, a protective film formed on the inner surface of the glass tube, and a fluorescent layer formed on the protective film, comprising steps of:

preparing a suspension containing a dispersoid mainly composed of substantially spherical metal oxide particles; and applying the suspension to the inner surface of the glass tube followed by burning so as to form the protective film on the inner surface of the glass tube, wherein the long/short diameter ratio of the metal oxide particles is between 1/1 and 1.5/1.

5. The method for producing a fluorescent lamp according to claim 4, wherein the average particle diameter of the metal oxide particles is between 1 nm and 100 nm.

6. The method for producing a fluorescent lamp according to claim 4, wherein the metal oxide particles comprise at least one selected from $Al_2O_3$, $TiO_2$, $SiO_2$, and $Y_2O_3$.

* * * * *